3,330,724
NITROFURAN DERIVATIVES FOR TREATING COCCIDIOSIS

Harold E. Van Essen, Jr., and Robert R. Baron, Charles City, Iowa, assignors to Salsbury Laboratories, a corporation of Iowa
No Drawing. Filed Dec. 17, 1965, Ser. No. 514,678
3 Claims. (Cl. 167—53.1)

This invention relates to new heterocyclic compounds of the furan series and more particularly to derivatives of nitrofuraldehyde in which the carbonyl oxygen is replaced by an ortho-nitrobenzoyl hydrazone. A typical representative of the compounds of this invention is the o-nitrobenzoic acid, 5-nitrofurfurylidene hydrazide, hereinafter, also more conveniently identified as NFBH which has been following configuration:

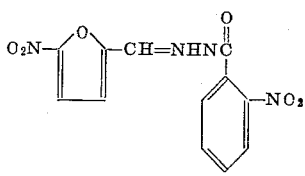

The new compound is a solid, yellow, crystalline and odorless substance and has a melting point of 200 to 202° C. It is prepared by interaction between o-nitrobenzhydrazide and 5-nitrofurfurylidene diacetate with the release of acetic acid in accordance with the following equation:

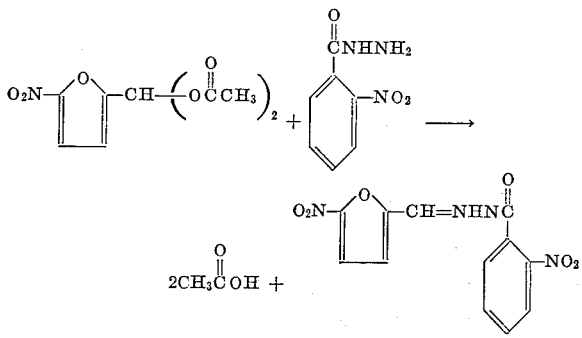

The following example will serve as an illustration of the synthesis of NFBH:

*Example 1.—o-Nitrobenzoic acid, 5-nitrofurfurylidene hydrazide*

25 grams (0.13 mole) of o-nitrobenhydrazide were refluxed for two hours with 33.5 grams (0.138 mole) of 5-nitrofurfurylidene diacetate in the presence of 500 ml. of denatured ethanol, 11 ml. of water and 11 ml. of sulfuric acid. The mixture was cooled and filtered and the resulting condensate was washed free of acid with denatured ethanol in water. The material was dried at 110° C. and the final product was obtained in a yield of 39 grams (92.9%). Its melting point was determined at 200 to 202° C. The substance on analysis was found to contain Carbon—47.38% (calculated value 46.88%)
Hydrogen—2.65% (calculated value 2.60%)
Nitrogen—18.41% (calculated value 18.26%)

NFBH is soluble in alkaline media and in view of its slightly acidic nature forms water soluble salts analogous to a number of sulfa drugs wherein the hydrogen of the nitrogen atom adjacent to the carbonyl group may be replaced by a member of the alkaline group and ammonium.

We have discovered that our new compound NFBH and its water soluble nontoxic salts have valuable therapeutic properties in the field of veterinary medicine. They are distinguished from other nitrofuran derivatives by their specific activity against coccidiogenic parasites which porduce the most common and damaging gastrointestinal disorders in poultry.

Due to the high degree of infectivity of the causative agents of coccidiosis and their easy dissemination through droppings and food contaminated therewith it is of utmost importance to the poultry industry to provide chemotherapeutic remedies which will prevent and control this contagious disease at the first sign of its clinical manifestations in an exposed flock.

For the purpose of this disclosure the practical utility of our new compounds will be illustrated by their application against *Eimeria acervulina* for which it seems especially adapted. Although the virulence of this pathogenic factor is not measurable primarily in terms of mortality figures, its pathological inroads are nevertheless most extensive. It manifests itself in progressive dehydration of the body tissues and general morbidity, retarded growth and gradual emaciation which all lead to a considerable decrease in the market value of the afflicted birds and in consequence, to great economic losses to the poultry raiser. The clinical criterium for diagnosis is the form of the droppings which are characterized by a watery foul smelling mucoid diarrhea occasionally accompanied by a slight discharge of blood. They are scored by veterinary parasitologists in terms of deviation from their normal appearance, the record being taken daily throughout the clinical period of the infection.

Another measure of tracing the course of *Eimeria acervulina* infections is expressed by the comparative values between weight gains of medicated-infected birds on the one hand and nonmedicated-noninfected controls on the other. During the interval between the fifth and the seventh day post infection, the coccidia usually cause the maximum inhibition of growth which is measurable by the ultimate weight gains (or lsses) at the conclusion of the test period. Assuming for instance the mean weight increase of the medicated-infected group is 180 g. and that of the nonmedicated-noninfected birds is 200 g., the ratio, $$\frac{180}{200} \times 100 = 90\%$$

represents the morbidity factor and indicates that due to the beneficial action of the drug the subnormal growth-rate produced by the infection fell only by 10%. If the morbidity factor of the infected but nonmedicated controls should be only 50%, the comparison would show that the medication has checked the stunting effect of the disease to the extent of 40%.

In accordance with our invention, the above defined new compounds which are not repulsive to the animals and at their effective dosage levels do not adversely affect their physiological functions, are advantageously employed by introducing the same into the animal organism in any form or manner in which they are apt to build up and maintain an effective blood or tissue level. This can be accomplished either by injection or by oral dispensation of suitable dosage units in capsules or tablets. As a preferred embodiment, however, the compounds are administered to the animals in combination with a solid, inert, and non-toxic vehicle in which they are uniformly and homogeneously dispersed. Inactive carriers of ingestible nature are any kind of vegetable food material such as ground corn, corn meal, dried distiller's grain, citrus meal, ordinary grain, mash, scratch and any other normal or commercial rations. The so medicated feed rations are placed before the birds for consumption ad libitum. The compounds may also be used as active ingredients in liquid compositions which can be conveniently prepared by means of drinking water in which they are dissolved or suspended with the help of skim milk, edible oils, syrups, wetting agents and emulsifiers.

We have also found that NFBH and its salts has specific activity against *Eimeria brunetti* which is essentially unresponsive to most of the currently available coccidiostats. The clinical syndrome of the infection is similar to that of *Eimeria acervulina* and the physiological effects are equally damaging.

The minimum beneficial dosage of our new drug in the feed has been observed at 0.01%, but concentrations of 0.05% and higher are preferred for more effective action particularly in case of a moderately heavy exposure of a flock.

*Example 2*

In a specific example, a given number of New Hampshire or Leghorn chicks were divided into two equal groups, one of which was infected with a dose of 3,000,000 *Eimeria acervulina* oocysts, while the other served as control. Medication of the infective group with 0.05% of NFBH was started three days prior to inoculation and continued for a total of 10 days, at the end of which period the chemotherapeutic value of the drug was assessed with finality. The fecal score was determined in accordance with our procedure which has been described in greater detail in U.S. 3,161,654 column 4, lines 29 to 71, owned by the assignee of the present application. The tests resulted in the findings of a 100% or perfectly normal fecal score, 0% mortality and a mean gains ratio or morbidity factor of 90.1%, attesting to the fact that despite the infection, the growth rate was sustained within 10% of the normal level of the uninfected and nonmedicated birds.

As previously stated, our new drug can also be dispensed in form of water soluble, non-toxic and physiological acceptable salts of which sodium, potassium, and ammonium are examples. These salts are particularly serviceable when the drug is to be administered in liquid preparations, like drinking water. For practical purposes of marketing and to facilitate the handling of the minute amounts of our novel drugs to be incorporated into the ultimate medicated rations, it is most desirable and advantageous to prepare a standardized concentrate with a high content of active ingredient which may be as high as 95% by weight of the composition. To that effect, non-toxic, inert material such as fuller's earth, talcum, bentonite, ground oyster shells, limestone and divers clays or edible substances like soybean meal, wheat middlings, corn germ meal or corn meal may be selected as the carrier medium. Such stock concentrations are specifically made and adapted for use in dilutions with an alimentary dispensing vehicle or element of sustenance so as to compound the medicated rations at their desired dosage level with utmost convenience. The availability of such commercial concentrates therefore is indispensable to the feed manufacturer and poultry raiser who ordinarily uses a standard weight package of premix for each 1,000 lbs. or one ton of commercial feed to produce the medicated compositions.

What we claim is:

1. A veterinary composition effective in the control of coccidiosis containing a solid, inert, non-toxic and orally ingestible vehicle and an effective, but non-toxic amount of o-nitrobenzoic acid, 5-nitrofurfurylidene hydrazide represented by the formula

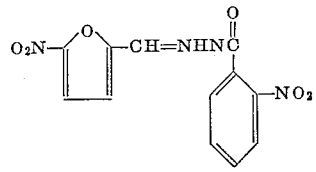

or its non-toxic physiologically acceptable salts.

2. A composition in accordance with claim 1 in which the solid, inert, non-toxic and orally ingestible vehicle is an animal feed.

3. A method for controlling coccidiosis in poultry which comprises orally administering to said poultry afflicted with coccidiosis an effective, but non-toxic amount of o-nitrobenzoic acid, 5 - nitrofurfurylidene hydrazide represented by the formula

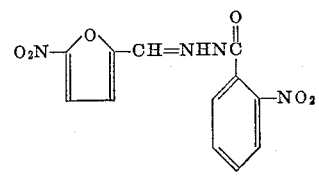

or its non-toxic physiologically acceptable salts.

References Cited

Chem. Abstracts, 56 page 11712f (1962).

ALBERT T. MEYERS, *Primary Examiner.*

JULIAN S. LEVITT, *Examiner.*

R. BARRESE, *Assistant Examiner.*